United States Patent [19]
Lowe

[11] Patent Number: 4,811,467
[45] Date of Patent: Mar. 14, 1989

[54] CARABINER HAVING IMPROVED GATE STRUCTURE

[76] Inventor: Greg E. Lowe, 4172 Piedra Ct., Boulder, Colo. 80301

[21] Appl. No.: 456,129

[22] Filed: Jan. 6, 1983

[51] Int. Cl.$^4$ ............................................. A44B 13/02
[52] U.S. Cl. .............................. 24/241 PS; 24/232 R
[58] Field of Search ........... 24/234, 232, 231, 241 SP, 24/235; 292/128, 121

[56] References Cited

U.S. PATENT DOCUMENTS

| | | | |
|---|---|---|---|
| 358,813 | 3/1887 | Jones | 24/234 |
| 406,188 | 7/1889 | Andress | 24/232 |
| 482,302 | 9/1892 | Cox | 24/234 |
| 596,215 | 12/1897 | Moritz | 24/233 |
| 688,006 | 12/1901 | Rickman | 24/234 |
| 733,575 | 7/1903 | Briggs | 24/232 |
| 992,787 | 5/1911 | MacLeod | 24/235 |
| 1,187,289 | 6/1916 | Ebersole | 24/233 |
| 1,709,235 | 4/1929 | Shaffer | 24/234 |
| 2,098,466 | 11/1937 | Rodenbach | 24/234 |
| 4,095,316 | 6/1978 | Gabriel | 24/234 |
| 4,333,212 | 6/1982 | Bibollet | 24/233 |

*Primary Examiner*—Peter A. Aschenbrenner
*Attorney, Agent, or Firm*—Robert E. Harris

[57] ABSTRACT

An improved carabiner configured to provide an enlarged gate opening for access and to permit smoother entry and release of ropes or other accessory devices to or from the carabiner, the carabiner comprising a C-shaped member with an articulated gate member extending across the opening of the C-shaped member and configured such that the articulated gate member may open beyond the normal interference with the back portion of the C-shaped member. Preferably, an end portion of the C-shaped member includes a slot and a bar extending transversely across the slot, with a complementary narrowed end portion on the movable gate member adapted to fit within the slot and including a notch configured to fit around the bar when in the slot to form a latch arrangement. The narrowed and notched portion on the end of the movable gate member enables the gate member to be further displaced, either into an opening defined in the back wall of the C-shaped member, or, in conjunction with an angled pivot member, offset to the side from the back portion of the C-shaped member. Also, by uniquely providing the slot and bat latch structure in the end of the C-shaped member, a smooth, noninterfering surface is provided when clipping in or removing a rope or other member within the carabiner.

4 Claims, 1 Drawing Sheet

CARABINER HAVING IMPROVED GATE STRUCTURE

BACKGROUND OF THE INVENTION

1. Field of the Invention

The present invention relates generally to devices commonly used in mountain climbing and similar pursuits, and more particularly to carabiners in the form of oval or D-shaped closed structures having an articulated gate member adapted to open beyond the normal interference with the back wall of the carabiner, and, further, providing for smooth, noninterfering clipping in and removing of ropes and other accessories by providing a slot and bar latching arrangement on an end of the C-shaped member of the carabiner, and a narrowed and notched latching portion of the latching arrangement on the articulated gate member.

2. Description of the Prior Art

Carabiners are widely recognized and used in climbing, or in any field in which a closed member having an articulated gate portion providing access to the interior thereof is desired. The devices may be formed of solid materials, or of tubing to afford light weight. In all instances using a latch arrangement at one end of the articulated gate member, the C-shaped member is narrowed and includes an inwardly facing notch while the articulated gate member is slotted to fit over the narrowed portion and includes a transverse bar to fit the notch thus forming a latch arrangement. Conventionally, the gate member is articulated around a pivot, usually a flush rivet, positioned perpendicular to the plane of the C-shaped member. Accordingly, when the gate member is displaced inward, and particularly in carabiners of fairly small dimension, the resulting opening to the interior of the carabiner is limited because of interference between the articulated gate member and the interior back wall of the C-shaped member.

To avoid the conventional limited access, carabiners having an angled pivot axis to offset the gate member alongside the back wall have been proposed. However, since the gate member latch portion includes a slot and notch, it is necessarily wide and requires a substantial angular offset at the pivot axis. As a result of the substantial offset, a side loading on the gate opening portion perpendicular to the plane of the C-shaped member can, in one direction, induce the gate member to be displaced inward with often times unexpected and highly undesirable release of ropes or accessories contained within the carabiner. For this reason, carabiners having substantial gate member offset from substantially angled pivots have not been widely accepted.

Also, as a result of the notch defined in the end of the C-shaped member adjacent the latch mechanism, ropes and other accessories inserted in or withdrawn from the interior of the carabiner had a tendency to hang up on the notch. This tendency is exaggerated in relatively small carabiners in which the gate opening is limited.

An example of a carabiner of this nature is described in U.S. Pat. No. 4,333,212 issued June 8, 1982 to Jean-Claude Bibollet.

SUMMARY OF THE INVENTION

The present invention, which provides a heretofore unavailable improvement over previous carabiner designs, comprises a substantially C-shaped member with the open portion of the C closed by an articulated gate member attached to the C-shaped member by a pivot at one end and engaging the C-shaped member at a complementary latching arrangement at the other end. Uniquely, the latching portion at the end of the C-shaped member includes a slot having a transverse bar extending therethrough. The end of the gate member complementary thereto is narrowed to fit within the slot and includes a notch adapted to fit around the transverse bar extending through slot of the C-shaped member. The articulated gate member is configured and arranged to open to a position beyond the back wall of the C-shaped member, preferably by fitting into a notch defined into or through the back wall of the C-shaped member, though alternatively by utilizing a somewhat angled pivot, which need not be angled to the conventional extent in view of the narrowed end portion on the gate opening portion. Also, as a result of the slot and bar arrangement on the latch portion of the C-shaped member, an interference-free surface is presented to ropes and other accessories being clipped in or removed from the carabiner.

Accordingly, an object of the present invention is to provide a new and improved carabiner which provides for an enlarged opening when the gate is displaced.

Another object of the present invention is to provide a new and improved carabiner which provides a smooth, noninterfering opening particularly at the latch portion of the C-shaped member.

Still another object of the present invention is to provide a new and improved carabiner which includes a narrowed end portion at the gate member latch portion.

These and other objects and features of the present invention become apparent from the following description.

DETAILED DESCRIPTION OF THE INVENTION

Figure 1:
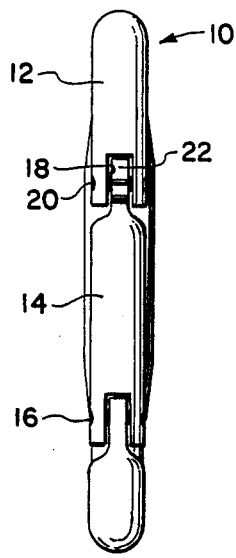
FIG. 1 is a front view of the opened end of the C-shaped member of a carabiner in accord with a preferred embodiment of the instant invention.
Figure 2:
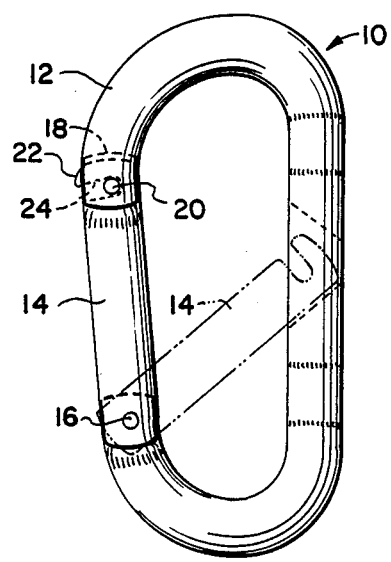
FIG. 2 is a side view of the carabiner shown in FIG. 1 with the gate opening member shown in ghosted fashion in the open position.
Figure 3:
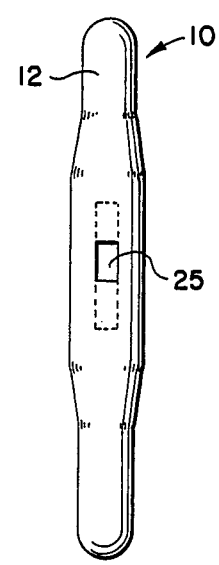
FIG. 3 is a rear view of the solid portion of the C-shaped member of the carabiner shown in FIGS. 1 and 2.

Turning now to the drawings, where like components are designated by like reference numerals throughout the various figures, a carabiner in accord with the instant invention is illustrated in FIGS. 1, 2 and 3 and generally designated by the reference numeral 10. As shown, carabiner 10 is formed of an essentially C-shaped member 12, and includes a gate member 14 articulated at pivot 16. C-shaped member 12 and gate member 14, when gate portion 14 is in the closed position, are generally oval in configuration, but may be D- shaped, have a varying curvature at the opposite end portions, or be of the generally known and recognized configurations of conventional carabiners. Slot 18 is defined into one end portion of C-shaped member 12, generally in the plane of C-shaped member 12, and includes a bar 20, which may conveniently be a rivet, extending transversely therethrough to form the latch end of C-shaped member 12. Gate member 14 includes a narrowed end section 22 adapted to fit within slot 18, with narrowed end portion 22 having defined therein an open notch 24 configured to fit to bar 20 when gate opening portion 14 is closed. It should be recognized that including narrowed end portion 22 on gate member 14 is a novel configuration which, either alone or in conjunction with other features of carabiner 10, affords substantial improvement over known carabiners. For instance, when carabiner 10 is open, as shown in FIG. 2, with gates opening member 14 displaced, the latch portion of C-shaped member 12 provides a smooth, noninterfering configuration to ropes or other accessories (not shown) which pass through the opening to clip in or be removed from carabiner 10.

Also, as shown in FIGS. 2 and 3, elongated opening 25 may be defined in the back wall of C-shaped member 12 to receive narrowed end portion 22 of gate member 14. By accomodating narrowed end portion 22 in opening 25, the effective access to carabiner 10 is substantially enlarged thereby again providing for sure and convenient movement of ropes and other accessories into and out of the interior of carabiner 10.

Figure 4:
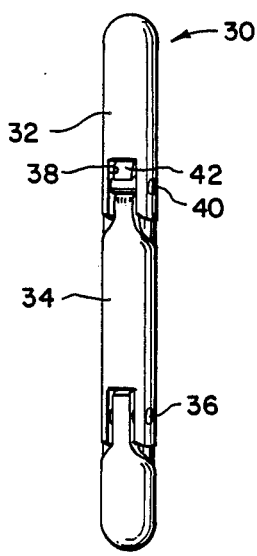
FIG. 4 is a view similar to that of FIG. 1 of another embodiment of the carabiner in accord with the instant invention.
Figure 5:
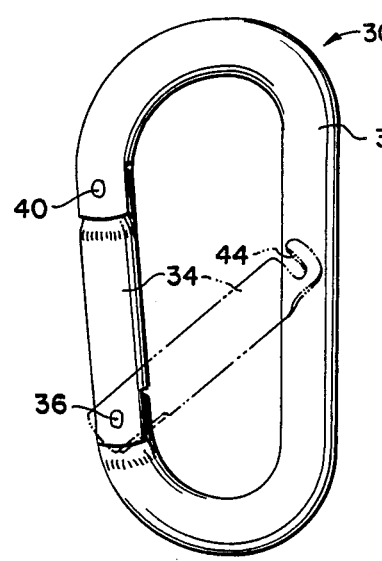
FIG. 5 is a side view similar to that of FIG. 2 of the carabiner of FIG. 4.

Another embodiment of the invention is illustrated in FIGS. 4 and 5 wherein carabiner 30 is shown. In large part, carabiner 30 includes C-shaped member 32, articulated gate member 34, pivot 36, slot 38 and bar 40 which are similar in function but different in struture from the corresponding components of carabiner 10, illustrated in FIGS. 1 through 3. For instance, pivot 36 is angled somewhat in order that narrowed portion 42 of gate opening member 34 may be pivoted in a somewhat offset manner relative to C-shaped member 32. Thus, as shown in FIGURE 5, when opened as illustrated in a ghosted position, gate opening member 34 will fit closely alongside C-shaped member 32, but will not require the offset of prior art, offset embodiments in that the narrowed portion 42 of gate opening member 34 requires less offset, and accordingly less angle on or at pivot 36. Thus not only does the latch arrangement of carabiner 30 provide for easier clipping in and removal from the interior thereof as a result of provision of slot 38 and bar 40 at the narrowed latch portion of C-shaped member 32, but again the available opening of carabiner 30 is greater than that of a conventional carabiner while providing or requiring only a minimal angling of pivot 36 as a result of the novel use of a narrowed portion 42 on gate member 44. The offset, being minimal, permits notch 44 to fit around bar 40 and, when closed, affords substantially greater resistance to undesirable opening under a side thrust than more conventionally configured carabiners having angled pivots to provide offset openings of gate opening members.

Figure 6:
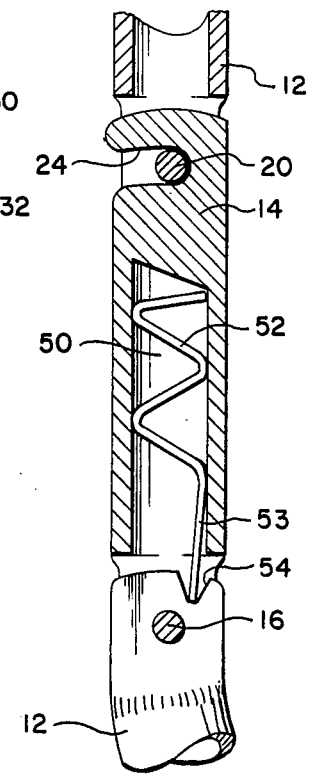
FIG. 6 is a detailed and sectional view of a preferred spring loading arrangement useful with the carabiners of the instant invention.

As shown in FIG. 6, a preferred method for biassing gate opening member 14 to the closed position is readily and conveniently accomplished by including a void 50 in gate member 14 to accomodate folded, flat spring member 52 therein. Linear end portion 53 of spring member 52 extends into notch 54 defined in C-shaped member 12. Accordingly, as gate member 14 is displaced, spring member 52 is both distended and shortened as a result of the offset from notch 54 from pivot 16. Such distending and compression urges gate member 14 into the closed position as illustrated, and provides for a lightweight, readily produced reliable biassing of gate member 14 into the closed position. While the embodiment of FIG. 6 is particularly illustrated with reference to carabiner 10, it will be recognized that the biassing means is equally applicable to carabiner 30, or to conventional carabiners.

In summary, the carabiner of the instant invention provides substantial advantages as a result of a simple, readily accomplished reconfiguration of components found on conventional carabiners. By narrowing the end of the gate member and providing a slot in the latch portion of the C-shaped member, a smooth opening is provided for more reliable use of the carabiner. Further, the result of the narrowed end portion of the gate member, an elongated opening may be defined in the back wall of the C-shaped member to accommodate a greater displacement of the gate member, or the pivot may be angled somewhat to displace the gate member alongside the rear portion of the C-shaped member. Such angling of the pivot in offset need not be as great as in previous known arrangements as a result of the narrowing of the latch portion of the gate member. These advantages, which are available with little or no increase in complexity, reliability or cost of the carabiner, particularly in the preferred embodiment, are accomplished without a major redesign of the carabiner components or the latch components, and thus do not involve additional complexity or the unknown of new components. Rather, the advantages are afforded by reconfiguring proven latch components.

Though only limited embodiments of the instant invention have been specifically illustrated and described, it is to be understood that variations of the invention will be apparent to those skilled in the art, and that the invention is limited only by the scope of the following claims.

What is claimed is:

1. An improved carabiner comprising:
   a C-shaped member having a back wall with an opening defined at least partially therein and end portions defining a gate opening across the open portion thereof and spaced from the back wall opening; and
   a gate member pivotally attached at one end to one end portion of the opening defined by the C-shaped member for movement from the gate opening substantially towards the back wall of the C-shaped member, and engaging the other side of the opening defined by the C-shaped member at a latch means structurally connecting the gate member to the C-shaped member, the gate member being narrowed in the plane of the C-shaped member at the portion thereof comprising the latch means and configured to fit within the opening defined in the C-shaped member back wall, whereby the gate member will both open wider as a result of accommodation into the back wall, and the narrow portion thereof will be shielded in the opening to permit smooth movement of ropes over the gate member.

2. A carabiner as set forth in claim 1 in which the latch means comprise a slot sized to receive the narrowed portion of the gate member defined at the latch portion of the C-shaped member into the end portion thereof and positioned substantially in the plane of the C-shaped member, a bar extending transversely across the slot, and an open notch defined in the narrowed portion of the gate member adapted to engage the bar, the open notch facing in a direction in common with the opening of the C-shaped member.

3. A carabiner as set forth in claim 1 in which spring means biassing the gate member into the closed position are included.

4. An improved carabiner comprising:
 a C-shaped body member having a back wall with an opening extending at least partially through the inner portion defined therein, and terminating in spaced end termini portions defining a gate opening;
 a gate member pivotally attached for rotation around an axis at one terminus of the C-shaped body members; and latch means defined at cooperating portions of the gate member and the other terminus portion of the C-shaped body member spaced from that in which the gate member is pivotally attached to the body member, the latch means comprising a narrow portion of the gate member having an open slot defined therein, and a slot defined in the terminus portion of the C-shaped body member adapted to receive the narrowed portion of the gate member, the C-shaped body member slot between including therein a transverse bar positioned to receive and fit within the open slot defined in the narrowed portion of the gate member, the back wall opening being positioned to receive the narrow portion of the gate member when the gate member is pivoted around the pivot mounting thereof to permit both wider opening and shielding of the narrow portion of the gate member in the back wall.

* * * * *